Feb. 13, 1951 J. H. VOSS 2,541,624

AUTOMATIC TELEPHONE SYSTEM-TRUNK SELECTION

Filed July 2, 1947 7 Sheets-Sheet 1

*INVENTOR.*
JOHN H. VOSS

*BY*

ATTORNEY

Feb. 13, 1951 J. H. VOSS 2,541,624

AUTOMATIC TELEPHONE SYSTEM-TRUNK SELECTION

Filed July 2, 1947 7 Sheets-Sheet 2

INVENTOR.
JOHN H. VOSS

BY [signature]

ATTORNEY

AUTOMATIC TELEPHONE SYSTEM-TRUNK SELECTION

Filed July 2, 1947 7 Sheets-Sheet 3

INVENTOR.
JOHN H. VOSS
BY Chas. Tm. Candy
ATTORNEY

Feb. 13, 1951 J. H. VOSS 2,541,624

AUTOMATIC TELEPHONE SYSTEM-TRUNK SELECTION

Filed July 2, 1947 7 Sheets-Sheet 4

INVENTOR.
JOHN H. VOSS

BY Chas. W. Candy

ATTORNEY

Feb. 13, 1951 J. H. VOSS 2,541,624

AUTOMATIC TELEPHONE SYSTEM-TRUNK SELECTION

Filed July 2, 1947 7 Sheets-Sheet 5

INVENTOR.
JOHN H. VOSS

BY

[signature]

ATTORNEY

INVENTOR.
JOHN H. VOSS
BY Chas. W. Candy
ATTORNEY

Feb. 13, 1951 J. H. VOSS 2,541,624

AUTOMATIC TELEPHONE SYSTEM-TRUNK SELECTION

Filed July 2, 1947 7 Sheets-Sheet 7

INVENTOR.
JOHN H. VOSS

BY Chas. W. Candy

ATTORNEY

Patented Feb. 13, 1951 2,541,624

UNITED STATES PATENT OFFICE 2,541,624

AUTOMATIC TELEPHONE SYSTEM—TRUNK SELECTION

John H. Voss, Rochester, N. Y., assignor to Automatic Electric Laboratories, Inc., Chicago, Ill., a corporation of Delaware Application July 2, 1947, Serial No. 758,609

13 Claims. (Cl. 179—18)

Figure 1:
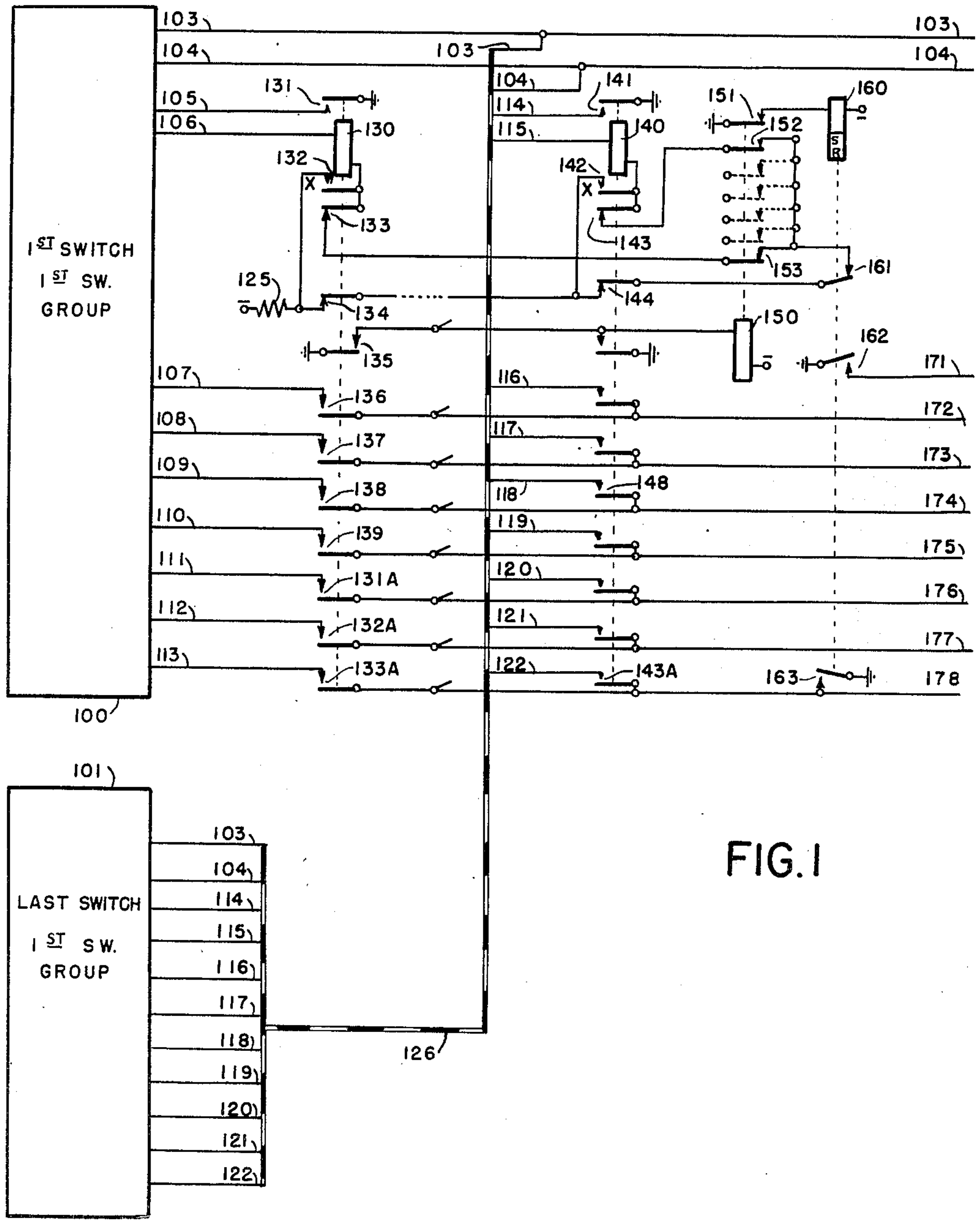

This invention relates in general to automatic telephone systems, but more particularly to all-relay systems of the general type shown and described in U. S. Patent 2,491,291 issued to John H. Voss et al. on December 13, 1949 and deals especially with improvements in trunk selecting equipment for such a system.

In the foregoing system, the automatic selection of trunks is accomplished through groups of trunk selecting relays external to the connectors, which serve to preselect idle trunks. These relay groups are seized momentarily by the said connectors in response to the dialing of a trunk group number, and automatically cause the operation of the proper units relay in the seizing connector, which thereupon extends the connection to the preselected idle trunk. The select relays are then immediately freed and made available for another call. The trunk selecting equipment is interlocked electrically to prevent double connections, or the switching of two calls through to the same trunk. Thus, during the brief instant that the trunk selecting equipment is held by a call, it cannot be seized by another call to the same trunk group.

In the previously mentioned application, also, a form of graded trunking was disclosed, in which certain toll trunks were made first choice, on a rotation basis, to a toll operator dialing a single digit "0," while certain other trunks in the same group were made second choice on such a call, on a non-rotation or first-idle-trunk basis, in case the first choice trunks were all busy. This second sub-group of trunks was also accessible on a rotation basis, as free service trunks, to certain privileged subscribers upon their dialing the single digit "9." The second sub-group of trunks was multipled to contacts of two tens relays, one of which was operated by the digit "9" and the other by the digit "0."

The main object of the present invention is to provide, for this general type of all relay system, an improved form of graded trunking, whereby certain trunks in a given group of trunks are made first choice to one group of connectors, while other trunks in the same group are made first choice to a second group of connectors, and still other trunks in the same group are made second choice to both groups of connectors, all in response to the dialing of the same single-digit call number. The invention is not limited to a connector system however, nor to two groups of switches, but it may be applied as well to a selector system, such, for example, as that shown and described in my co-pending joint application Serial No. 720,756 filed January 8, 1947, now Patent No. 2,535,764, granted December 26, 1950.

One feature of the invention is therefore the division of the trunk connecting switches into groups, and the provision of a separate group of trunk access relays for each switch group, with a separate trunk access relay in each such relay group for each switch in the associated switch group. Each relay is controlled from its associated switch, in response to the dialing of the appropriate call number, and when operated, extends such switch's units and other control conductors through to the other trunk selecting equipment.

Another feature of the invention is the division of one of the trunk groups connected to the contacts of one of the tens relays of the said switches into a number of sub-groups, and the provision of a separate group of trunk select relays for each such sub-group. These sub-groups of trunks are also further divided into first choice groups and second choice groups, there being a first choice group for each switch group, and a single second choice group common to all switch groups.

Still another feature is the provision of a common group of trunk group relays containing a separate trunk group relay for each of said first-choice trunk groups, and correspondingly, for each of said switch groups. These relays are controlled jointly by a calling switch and an operated trunk access relay, and when operated serve to extend the units and other control conductors of such switch through to the trunk select relays corresponding to the first-choice trunk sub-group associated with, or assigned to, the calling switch group. Chain circuits local to said trunk group relays and said trunk access relays, prevent the seizure of said trunk group relays by more than one switch group or more than one switch in that group at a time.

A further feature consists in the inclusion, in each said group of first-choice trunk select relays, of a switching-through busy relay, which operates automatically when all of the trunks of the corresponding first-choice trunk group are engaged, to prepare the extension of the units and other control conductors to the second-choice trunk select relays. This is in addition to the individual trunk busy relays which also form a part of each trunk select group, where they control the pre-selection of the trunks of the associated sub-group.

Other objects and features of the invention will be apparent from the description and claims which follow, when considered in conjunction with the accompanying drawings comprising Figures 1 to 7 inclusive which illustrate one embodiment of the invention, as applied to a 200-line connector system of the class referred to, it being understood that only sufficient equipment is shown to enable the invention to be understood, and that various modifications and re-arrangements may be made without departing from the spirit and scope of the said invention.

Figure 2:
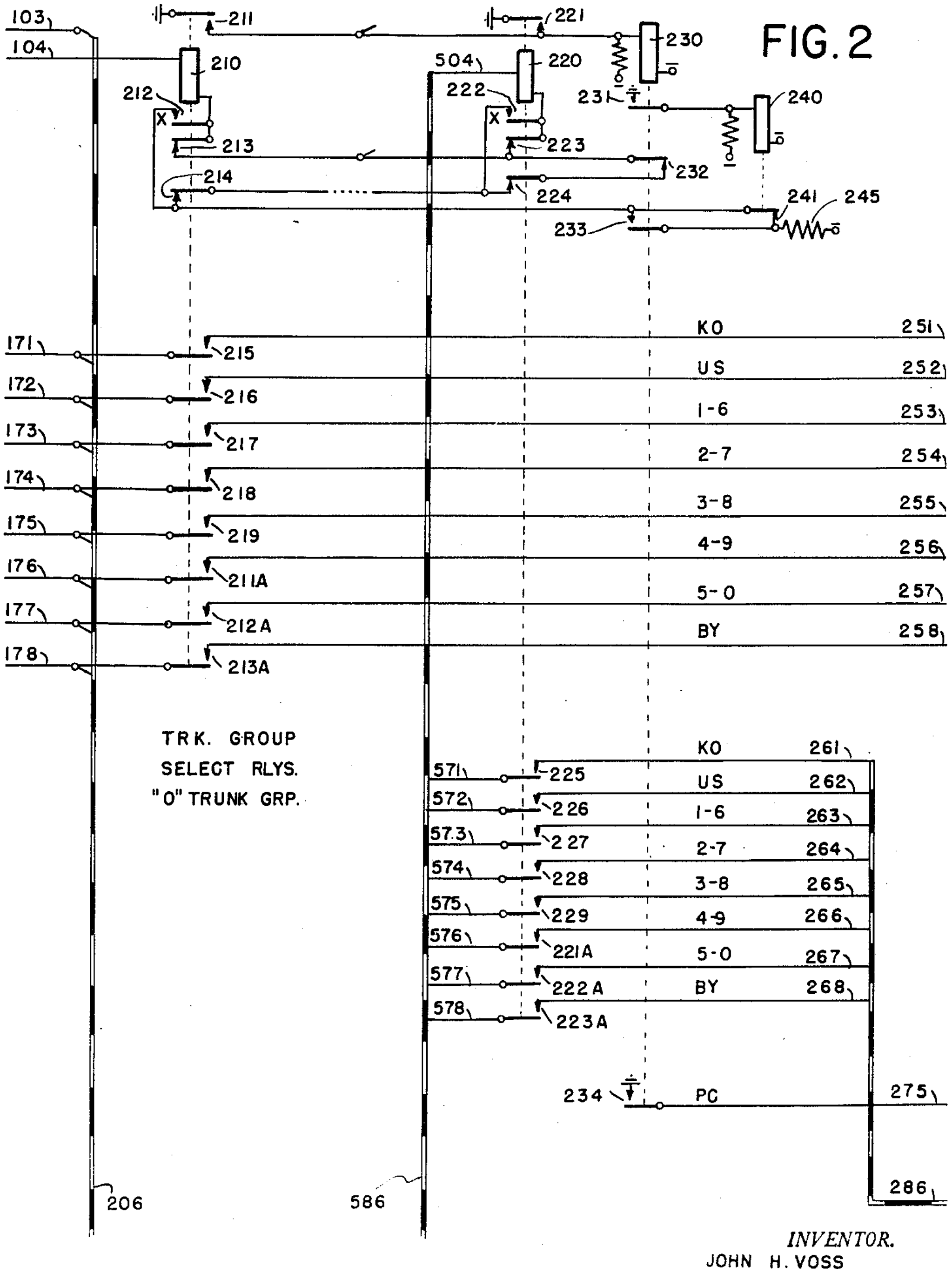
Figure 3:
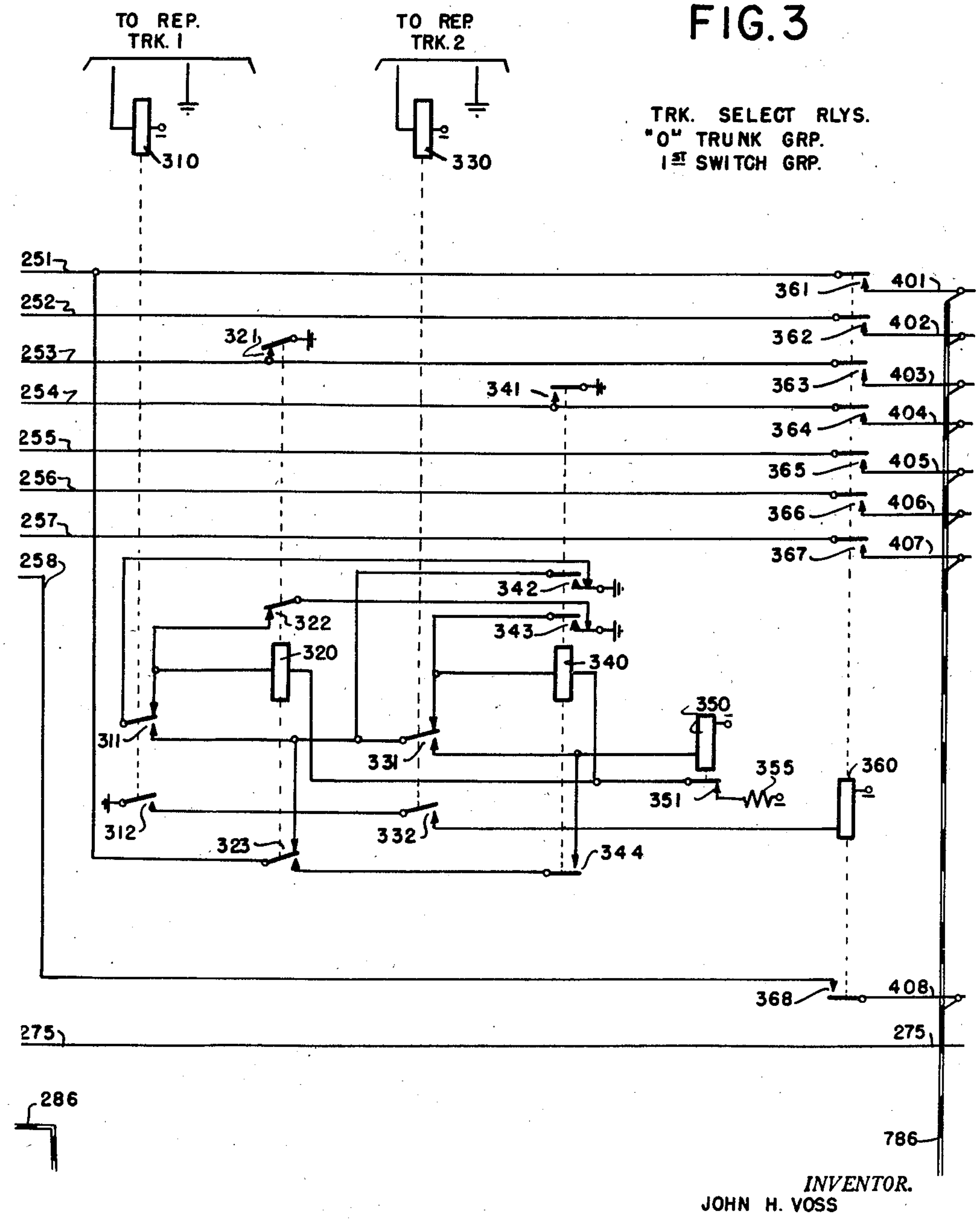
Figure 4:
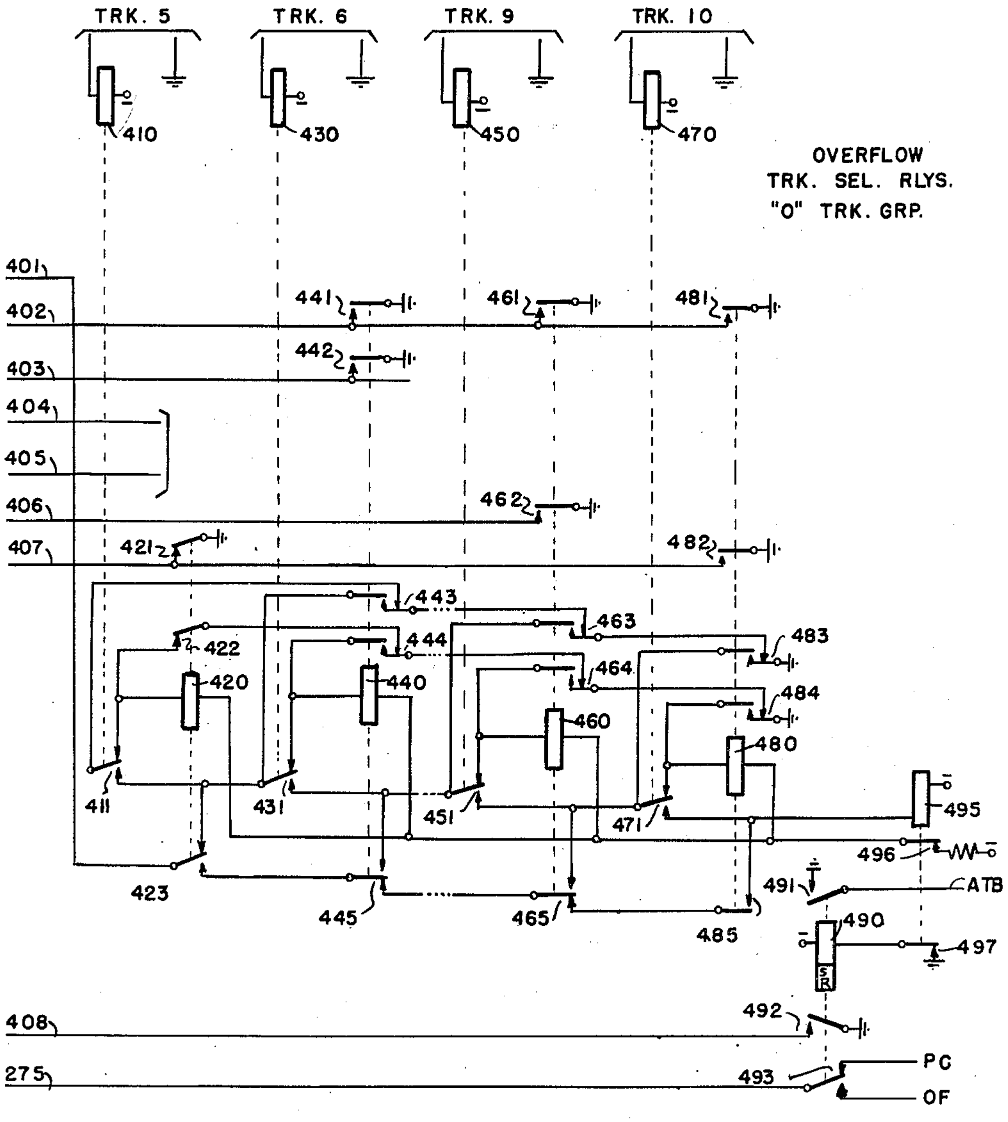
Figure 5:
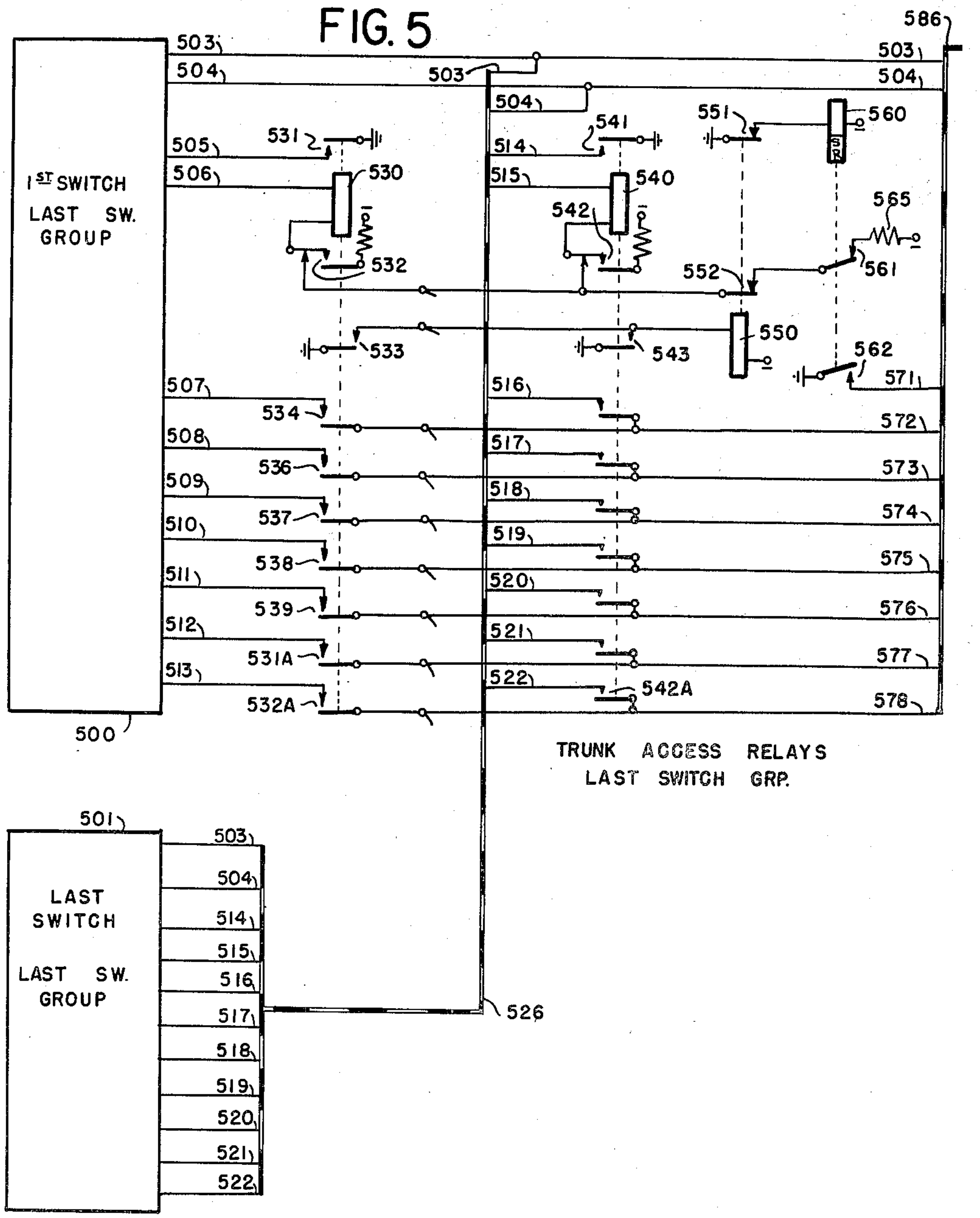
Figure 6:
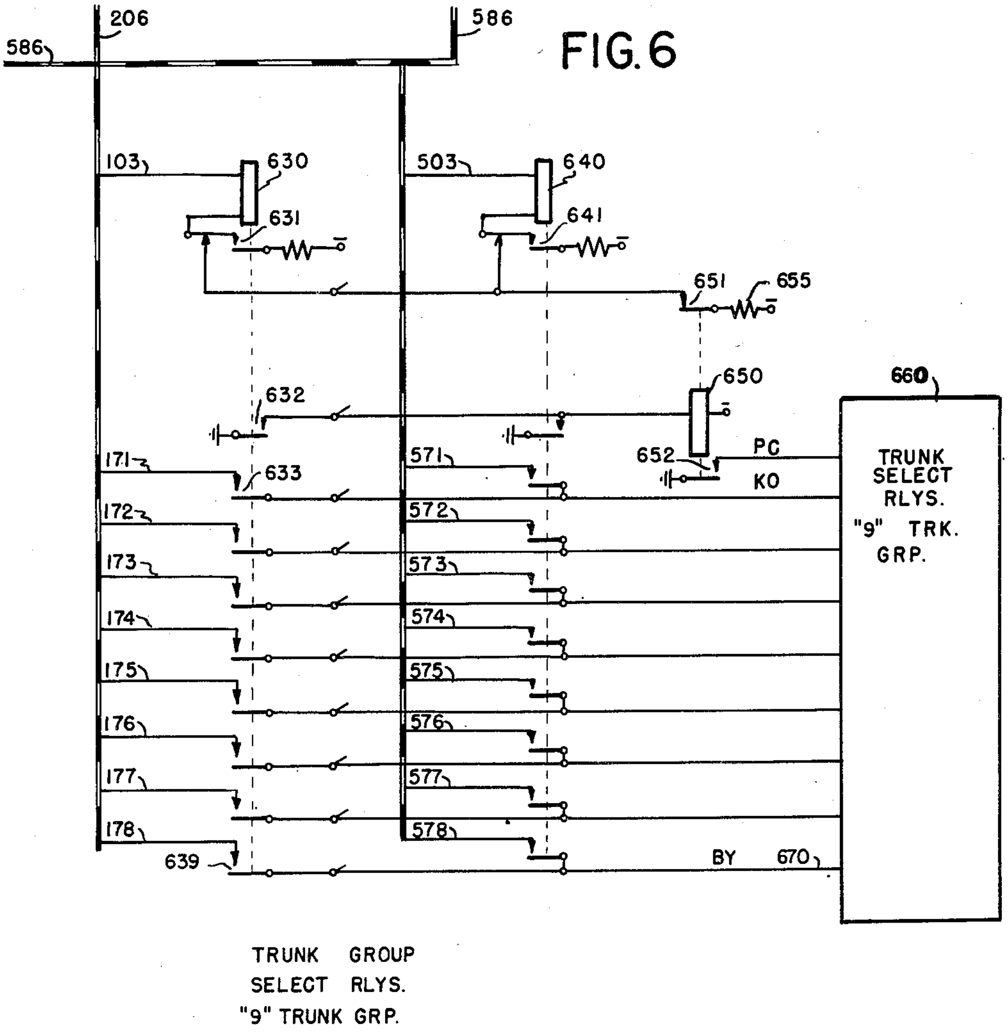
Figure 7:
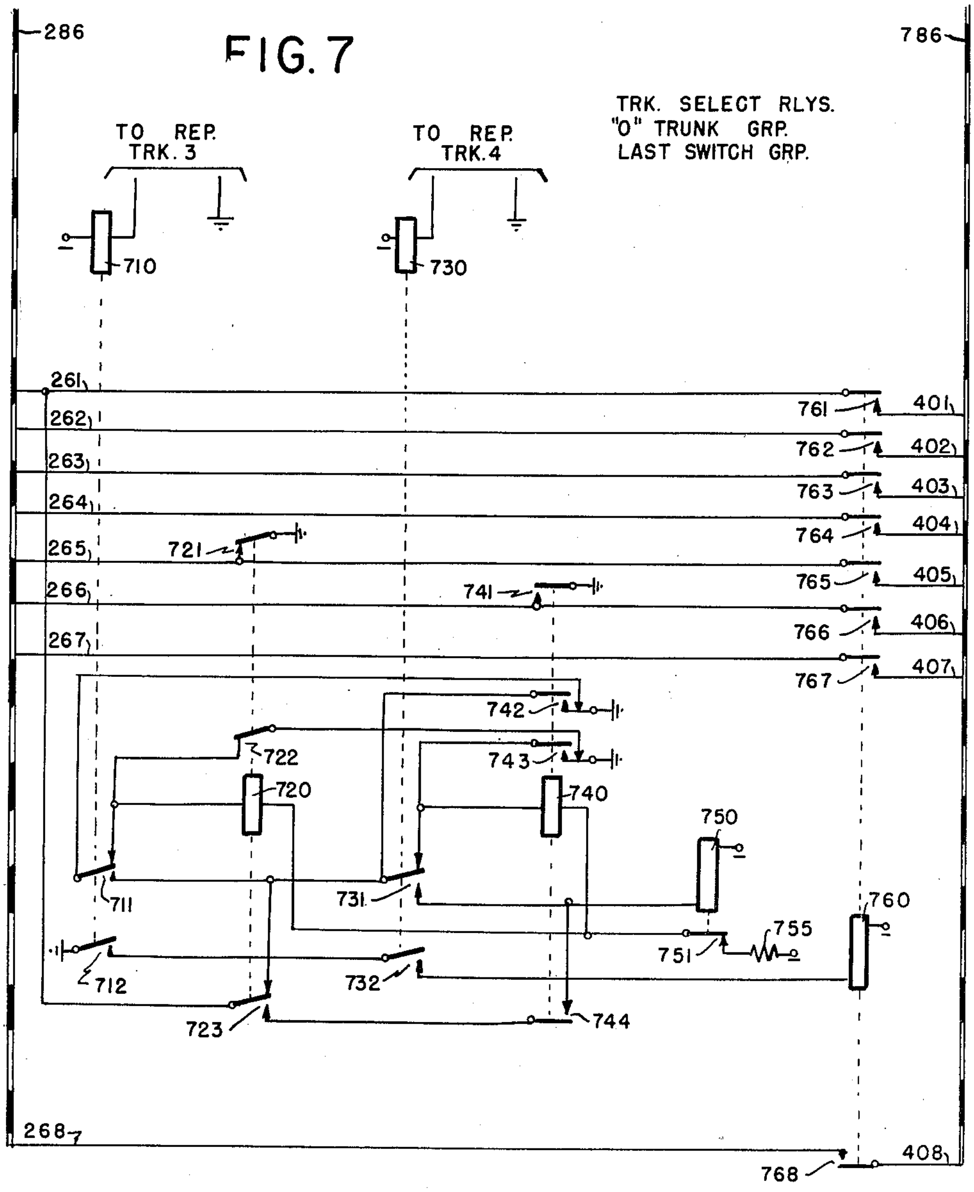

With reference to the drawings, Figures 1 and 5 shown in diagrammatic form two groups of trunk connecting switches and two associated groups of trunk access relays, while Figure 2 shows the special trunk group relays of the invention, which give access to the special "first-choice" trunk select relays shown in Figures 3 and 7, which give access in turn to the second-choice or "overflow" trunk select relays shown in Figure 4. In Figure 6 is shown a simple group of regular trunk select relays also accessible through the same trunk access relays of Figures 1 and 5. This figure is included to show one way in which other trunk groups may be included in the system. It will be apparent that this could just as well have been a special group of trunk group relays like in Figure 2, giving access to other special trunk select relays as in Figures 3, 7 and 4, in case graded trunking is required for more than one main trunk group.

In Figure 1 the rectangles on the left marked 100 and 101 represent the first and last switch of a first group of 200-line connectors such as shown in the previously mentioned Patent 2,491,291, which are assumed to be divided into two groups corresponding to the grouping of the links. They might also however, represent a group of similar 100-line connectors in a 100 line exchange, divided arbitrarily into two groups. They might also, as previously mentioned, represent selectors, and might also be divided into a plurality of groups, with corresponding first choice trunk groups. These switches consist essentially of group and units relays and a units-switching relay controlled from a group of counting relays in response to dial pulses. The lines or trunks are reached through the contacts of the said group and units and units-switching relays, and each group relay gives access to ten lines or trunks or a combination of both, up to a total of ten, which are connected directly to the contacts of the said group relays. In the case of a selector switch, only the group or tens relays are controlled from the counting relays, the units and units switching relays being controlled automatically from the trunk selecting equipment, in order to direct the call to a preselected connector or trunk. In the case of a connector switch, in a connector system, if the first digit indicates that the call is to a trunk, the action is similar to that described in the preceding sentence, but if the first digit indicates a call to a subscriber line, the trunk selecting equipment is not involved, and the units relays and the units switching relay are controlled from the counting relays, in response to a succeeding digit, to extend the call.

At the upper right in Figure 1 are shown the "trunk access' relays associated with the first group of switches. In this relay group, one "access" relay such as 130 or 140 is provided for each switch in the associated switch group. Thus, relay 130 is associated with the first switch 100 in the first switch group and relay 140 is associated with the last switch 101 of the same group, similar access relays not shown, being provided for each of the intervening switches, not shown. These relays operate momentarily when seized by the associated switch, and connect the units relay operating conductors and certain other control leads through to the trunk group relays of Figure 2. Relay 150 is a "lockout" relay which operates momentarily whenever any "access" relay in this group operates, and opens the operate circulits of all of the other access relays of the same group. Relay 160 is a normally energized "kickoff" relay which releases to give a busy signal and pre-select the next idle trunk, in cases where with trunks available a call is not switched through promptly, due to a faulty trunk or other cause.

In Figure 2, which belongs on the right of Figure 1, one "trunk group relay," such as 210 or 220 is provided, for each group of switches, or correspondingly, for each group of first-choice trunk select relays. These trunk group relays operate from the operated tens relay of the calling switch or from the counting relays, depending on the particular switch circuit employed, and extend the units and other control leads from the trunk access relays involved to the proper first-choice trunk select relays. Thus, in the embodiment illustrated for example, the relay 210 may be operated from any switch in the first switch group, in response to the dialing of the single digit "0" to such switch, and will thereupon extend the control conductors from the trunk access relays of Figure 1 to the first choice trunk select relays of Figure 3. Similary, relay 220 may be operated from any switch in the second or last switch group in response to the dialing of the digit "0" to such switch, to extend the control conductors from the trunk access relays of Figure 5 to the first-choice trunk select relays of Figure 7. Relays 230 and 240 are "lockout" relays which operate momentarily whenever any trunk group relay in this group operates, and open the pull-up circuits of the unoperated trunk group relays.

In the first-choice trunk select relay group of Figure 3, which goes on the right of Figure 2, a "trunk busy" relay such as 310 or 330 is provided for each trunk in the corresponding first-choice trunk group, consisting in this case of trunks 1 and 2 of the "0" group. Each of these relays is normally operated from the associated trunk or repeater, and releases whenever this trunk is seized by a call, or otherwise made busy. A "preselect" relay such as 320 or 340 is also provided for each trunk in the sub-group. These relays operate one at a time in rotation, as the trunks of the sub-group are taken into use, to preselect the next trunk. As each relay operates it releases the preceding preselect relay and places ground on the next corresponding units conductor, which is open at this time. Relay 350 is a "reset" relay which operates following the seizure of the last trunk in the sub-group to release the last preselect relay and re-start the preselect cycle, while relay 360 is a "busy switching" relay, which operates when all trunks of the sub-group are busy, to extend the units or "units marking" conductors through to the second choice or "overflow" trunk select relays of Figure 4.

In the overflow trunk select relays of Figure 4, which goes on the right of Figure 3, "trunk busy" relays are indicated at 410, 430, 450 and 470, and "trunk preselect" relays at 420, 440, 460 and 480, corresponding respectively to second-choice trunks 5, 6, 9 and 10 of the "0" group. Similar relays, corresponding to trunks 7 and 8 of this group, have been omitted, to simplify the drawing. In the given instance therefore, a second choice group of six trunks is provided, together with two first-choice groups of two trunks each, or ten trunks in all. It could also have been arranged for two first choice groups of three trunks each and a second choice group of four trunks, as well as various other combinations, provided always that the total does not exceed ten, though it may be less. Relay 490 is a normally operated "all-trunks busy" relay, which releases whenever all of the overflow trunks are busy to control various metering circuits, and relay 495 is the "reset" relay. The preselect relays as shown in Figure 4 and the other figures are arranged to select the idle trunks in rotation at all times. Should non-rotation be desired however, it is only necessary to disconnect the upper make-before-break contacts such as 443, on the preselect relays, or omit these springs entirely, and connect direct ground to break-make contacts corresponding to contacts 411 on the first trunk busy relay.

In Figure 5, which goes below Figure 1 and is similar thereto except for the use of a different lockout circuit, the rectangles 500 and 501 represent the first and last switches respectively in the last switch group, which in this case is the second switch group, relays 530 and 540 are access relays corresponding to relays 130 and 140, relay 550 is the "lockout" relay, and relay 560 is the "kickoff" relay.

In the trunk group relays of Figure 6, which goes to the right of Figure 5 and below Figure 2, a "trunk group" relay such as 630 or 640 is required, for each switch group. These relays operate from the calling switch, similarly to the trunk group relays 210 and 220 of Figure 2, but in response to the dialing of a different group number. In the case here considered for example, relay 630 may be operated from any switch in the first switch group in response to the dialing of the single digit "9" to such switch, and upon operating extends the control conductors thereof to a regular group of trunk select relays, similar to those of Figure 4, indicated at the right of Figure 6 by the rectangle 660. In like manner, relay 640 may be operated from any switch in the second group of switches in response to the dialing of a "9" thereto, and extends the control conductors thereof to the same group of trunk select relays. Relay 650 is a "lockout" relay which operates whenever any of the associated group relays operate, to open the operate circuit of the other group relays of this figure.

It may be noticed at this point that the trunk access and trunk group relays of Figures 1, 2, 5 and 6 are all provided with different lockout circuits, no two being exactly alike. Thus in Figures 1 and 2, whose lockout chains are generally similar, both the operating and locking circuits of the "access" and "group" relays therein, except for the locking circuit of the first relay, are taken through series break contacts on the other relays, thereby effectively preventing any two such relays in either of said figures from being operated at the same time. If two attempt to operate at the same time, the relay having the leading position in the chain will cut off the other. In Figures 5 and 6 on the other hand, while the circuit is simpler and avoids the use of series contacts, which may at times be considered undesirable, there is a brief unguarded interval between the operation of these relays and that of the associated lockout relay, when a second relay might operate and lock. In this way, I have provided for a number of alternative arrangements, including those of previous disclosures, which may be used as required, or as preferred.

In the first-choice trunk select relay group of Figure 7, which goes to the right of Figure 6, and below Figure 3, with which it is identical, a "trunk busy" relay such as 710 or 730 and a "preselect" relay such as 720 or 740 is provided for each trunk in the associated sub-group consisting in this case of trunks 3 and 4 of the "0" group. A "reset" relay 750 and a "busy switching" relay 760 are also provided. These relays operate similarly to the corresponding relays in Figure 3, but are accessible to only the second group of switches, through springs on relay 220 in Figure 2.

The general description of the drawings and of the apparatus shown therein, having now been completed, a brief explanation of the operation of the trunk selecting circuits in response to imaginary trunk calls will follow, in order to facilitate complete understanding of the invention.

*Calls to "0" trunk group from first switch group*

Assuming that the first switch 100 of the first switch group has been seized by a call, the dialing of the single digit "0" to this switch causes the counting relays thereof, not shown, to operate the "0" tens relay therein, also not shown, in known manner. The counting relays also at the same time cause the operation of the trunk access relay 130, by grounding conductor 106. This ground, after passing through the winding of relay 130, goes through break contacts 133 and 153, make contacts 161, break contacts 144 and 134 and similar contacts on the intervening trunk access relays not shown, to negative battery through resistor 125. The "0" tens relay upon operating, prepares connections for all of the trunks of the "0" group, which are, as previously mentioned, connected to the contacts of this relay.

Trunk access relay 130 upon operating, at preliminary make contacts 132 locks to battery at resistor 125 independently of the original local circuit, at break contacts 133 opens its own operate circuit, and at break contacts 134 opens the operate circuit of all of the associated access relays, as well as the locking circuit of the access relays following it in the chain. Relay 130 also, at its lower make contacts extends the units-marking and busy conductors from the switch 100 to the springs of the trunk group relays 210 and 630. The "extra-control" conductors, for marking calls from operators, have been omitted as not necessary to this disclosure. Relay 130 further, at make contacts 135, closes an obvious circuit to lockout relay 150 which operates. Relay 150 upon operating, at its lower break contacts 152, 153, etcetera, individually opens an additional point in the operate circuit of each access relay in the group, and at break contacts 151 opens the circuit of the normally operated kick-off relay 160. Relay 160 is made slow to release however, as by the use of a copper slug on the heel end of the core, and ordinarily remains operated, since its circuit in most cases is interrupted only very briefly. Finally access relay 130 at make contacts 131, causes the operation of trunk group relay 210 over the following circuit: ground at make contacts 131, conductor 105, make contacts of the operated "0" tens relay, not shown, in the switch 100, conductor 104, winding of relay 210, break contacts 213 and 232, break contacts 224 and 214 and similar break contacts on any intervening trunk group relays not shown, and break contacts 241 to battery through resistor 245.

Trunk group relay 210 upon operating over this circulit, at preliminary make contacts 212 locks to battery at resistor 245 independently of the pull-up circuit, at break contacts 213 opens its own pull-up circuit, and at break contacts 214 opens the pull-up circuit of all of the associated trunk group relays, as well as the locking circuit of the trunk group relays following it in the chain. Relay 210 also, at its lower make contacts extends the units-marking and busy conductors from switch 100 to the first-choice trunk select relays of Figure 3, in addition to preparing the kickoff circuit, at contacts 215. Finally relay 210 at make contacts 211 closes an obvious circuit to lockout relay 230 which operates. Relay 230 at make contacts 233 closes an alternative locking circuit for relay 210 shunting break contacts 241; at break contacts 232 opens an additional common point in the pull-up circuit of all of the associated trunk group relays, and at make contacts 234 grounds conductor 275 to operate a peg count meter not shown, in Figure 4, through make contacts 493 of the normally operated all-trunks-busy relay 490. Relay 230 also, at make contacts 231 closes the operate circuit of lockout relay 240. Relay 240 thereupon operates and opens break contacts 241. This is without effect at the moment however, as these contacts are now shunted as previously mentioned, by the closed make contacts 233.

Immediately upon the extension of the units marking conductors to Figure 3, assuming both first choice trunks 1 and 2 in the associated subgroup to be idle and that relays 310, 320 and 330 in Figure 3 are operated as shown, ground from make contacts 321 is passed back to the switch 100, by way of the 1—6 units conductor 253, make contacts 217, conductor 173, make contacts 137 and conductor 108, and causes the operation of the 1—6 units relay, not shown, in the switch 100. The 1—6 units relay of switch 100 upon operating causes the call to be switched through, and to seize the #1 trunk in the "0" trunk group. At the same time the counting relays, not shown, in switch 100 are released, and cause the release of trunk access relay 130. Trunk access relay 130 upon releasing, opens its locking circuit and prepares its pull-up circuit. Relay 130 also, at its lower make contacts opens the units-marking and busy conductors, and at make contacts 135 opens the circuit of lockout relay 150 which restores to re-energize the still operated kickoff relay 160 and re-establish the original pull-up circuits to the access relays. Finally relay 130 at make contacts 131 opens the circuit of trunk group relay 210 which also restores. Relay 210 upon releasing opens another point in the units marking and busy conductors, opens the kickoff conductor, opens its locking circuit and prepares its pull-up circuit. Relay 210 also at make contacts 211 opens the circuit of lockout relay 230 which restores and releases lockout relay 240. Relay 240 restoring, re-establishes the original pull-up -circuit for the trunk group relays, thereby making these relays available for the next call.

Meanwhile, the seizure of the #1 trunk of the "0" group by the switch 100 causes the trunk or repeater to open the circuit of the normally operated trunk busy relay 310 which releases. The closing of break contacts 312 thereupon closes a point in the circuit to the busy switching relay 360, while make contacts 311 open the operate circuit of pre-select relay 320 now locked through make contacts 322 to ground at back contacts 343. At the same time back contacts 311 complete a circuit for pre-select relay 340 as follows: ground at back contacts 342, back contacts 311, make contacts 331, winding of relay 340, and break contacts 351 to battery through resistor 355.

Pre-select relay 340 thereupon operates over this circuit and at make contacts 341 grounds the 2—7 units-marking conductor 254, now open at the trunk access and trunk group relays. Relay 340 also, at make-before-break contacts 342 closes an alternate operate circuit for itself and opens its original operate circuit, at make-before-break contacts 343 closes a locking circuit for itself and opens the locking circuit of relay 320, and at make contacts 344 closes a point in the kickoff circuit to reset relay 350. This is without effect at the moment however, as the kickoff circuit is now open at the trunk access and trunk group relays. Pre-select relay 320 restores as soon as its locking circuit is opened and removes ground from the 1—6 units marking conductor.

If now another call is made from the same switch group to the "0" trunk group while the first trunk is engaged, the action will be generally similar to the foregoing except for the use of a different switch and a different access relay, and the routing of the call to a different trunk.

If for example such a call is made from the switch 101, the dialing of the digit "0" to this switch will cause the operation of the "0" tens relay therein and cause ground to be placed on conductor 115. This ground thereupon passes through the cable 126, winding of access relay 140, break contacts 143 and 152, make contacts 161, break contacts 144 and 134 and similar contacts on the other access relays, not shown, to battery at resistor 125. Trunk access relay 140 operates over this circuit, locks independently of relays 150 and 160, operates lockout relay 150, and extends the units and busy conductors of the switch 101 through to the trunk group relays of Figure 2. Relay 140 at the same time passes ground from make contacts 141 back to the switch 101, via conductor 114 and cable 126. This ground thereupon passes through make contacts of the operated "0" tens relay in the switch and back again over conductor 104 to the trunk group relay 210. Trunk group relay 210 operates over this circuit, locks operated as before, operates lockout relays 230 and 240, and extends the units marking and other control conductors through to Figure 3. Relay 230 again closes the meter circuit at its lower contacts 234.

Immediately upon the extension of the units marking conductors to Figure 3, ground from the now closed make contacts 341 passes back to the switch 101, by way of the 2—7 units conductor 254, make contacts 218, conductor 174, make contacts 148, conductor 118 and cable 126, and causes the operation of the 2—7 units relay, not shown, in the switch 101. The 2—7 units relay thereupon causes the call to be switched through to the #2 trunk of the "O" trunk group. At the same time switch 101 causes the release of trunk access relay 140, which in turn releases lockout relay 150 and trunk group relay 210, and the latter then releases lockout relays 230 and 240.

Meanwhile, the seizure of the #2 trunk by the switch 101 causes the trunk repeater to open the circuit of the normally operated trunk busy relay 330, which restores. Break contacts 332 thereupon close the operate circuit of the busy switching relay 360 which operates, from ground at break contacts 312, and extends the units marking and control conductors through to Figure 4. At the same time make contacts 331 open the operate circuit of pre-select relay 340 now locked to make contacts 343, while break contacts 331 complete a circuit to reset relay 350, from ground at make contacts 342. Reset relay 350 operates over this circuit and disconnects negative battery from pre-select relay 340 which restores and removes the ground marking from the 2—7 units conductor 254. Relay 340 at make contacts 342 opens the original circuit to relay 350, but at break contacts 342 closes another circuit to this relay by way of back contacts 311 to prevent its release at this time. Any further calls from the same switch group to the same trunk group will now be directed to a second-choice trunk in the overflow sub-group under the control of the trunk select relays of Figure 4. Should trunk #1 or #2 become free before another call is made to these trunks from the same switch group, the reoperation of the corresponding trunk busy relay will release relays 350 and 360 and re-operate the corresponding pre-select relay.

Assuming however, a third call to the "0" trunk group from the same switch group while trunks 1 and 2 of this group are still engaged, and assuming also that all of the second-choice trunks are idle, the operation of trunk group relay 210 following the operation of the trunk access relays will extend the units, busy and kickoff conductors to Figure 4, where trunk busy relays 410, 430, 450 and 470, and pre-select relay 420 are operated as shown. Ground from the closed make contacts 421 thereupon passes back to the calling switch by way of the 5—0 units marking conductor 407, make contacts 367, conductor 257, make contacts 212A and conductor 177, to operate the 5—0 units relay in said calling switch, and thereby extend the call to trunk #5. The seizure of trunk #5 causes the release of trunk busy relay 410, whereupon pre-select relay 440 operates, and pre-select relay 420 restores.

In a fourth call from the same switch group, with trunks 1, 2 and 5 still busy, ground from make contacts 442 will be passed back to the calling switch, by way of the 1—6 units conductor 403, make contacts 363, conductor 253, make contacts 217 and conductor 173, to operate the 1—6 units relay in the calling switch, while ground from make contacts 441 will operate the units switching relay therein, by way of conductor 402, make contacts 362, conductor 252, make contacts 216 and conductor 172. The operation of these two relays, not shown, causes the calling switch to extend the call to trunk #6 in known manner.

Fifth, sixth and seventh calls from the same switch group, with trunks 1 and 2 still busy, would similarly cause the operation of the 2—7, 3—8 and 4—9 units relays respectively of the calling switch, together with the units switching relay, to direct these calls respectively to trunks #7, #8 and #9, with pre-select relay 480 operating on the seventh call to pre-select the last trunk. An eighth call therefore, from the same switch group, with trunks 1 and 2 still busy, will cause the call to be directed to trunk #10. Seizure of this trunk will release trunk busy relay 470. Relay 470 thereupon reverses its contacts 471 and closes a circuit to rest relay 495 from make contacts 483. Reset relay 495 thereupon operates and disconnects negative battery from all of the pre-select relays of Figure 4, and pre-select relay 480 restores. If any of the trunks 5 to 9 are idle at this time, the pre-select relay of the first such idle trunk will thereupon re-operate and release reset relay 495.

If all of the other "0" trunks accessible to the first switch are still busy, at the time the #10 trunk is taken into use however, the release of relay 480 establishes an alternative circuit for reset relay 495, from ground at back contacts of the make-before-break contacts 483 by way of back contacts 463, 443, 411, 431, 451 and 471, and similar contacts on the other trunk busy and pre-select relays not shown. Reset relay 495 therefore remains operated, and maintains its break contacts 496 and 497 open. All-trunks-busy relay 490, which has been made slow to release, as by the use of a copper slug on the heel end of its core, will therefore release after a suitable delay period and at break contacts 491 will close a circuit for the operation of an all-trunks-busy meter, not shown. Relay 490 also at break contacts 492 prepares a busy circuit, and at break contacts 493 prepares a circuit to an overflow meter.

If, with all of these trunks busy as indicated still another call is made to this trunk group from the same switch group, the extension of the units marking conductors to Figure 4 is without effect, since no pre-select relays are operated. The grounding of conductor 275 however, at make contacts 234 causes the operation of an overflow meter, not shown, in Figure 4, by way of back contacts 493. Busy ground from break contacts 492 at the same time is passed back to the calling switch by way of conductor 408, make contacts 368, conductor 258, make contacts 213A, and conductor 178. This operates a busy relay, not shown, in the calling switch, whereupon the said switch gives a busy signal to the calling party, and releases the trunk access and trunk group relays.

*Calls to "0" trunk group from second switch group*

Assuming now that the first switch 500 of the second switch group has been seized by a call, the dialing of the digit "0" to this switch causes the "0" tens relay therein, not shown, to operate. At the same time the switch 500 causes trunk access relay 530 to operate, from ground on conductor 506, through the winding of relay 530, back contacts of the make-before-break contacts 532, break contacts 552, make contacts 561 and resistor 565 to negative battery.

Trunk access relay 530 upon operating, locks direct to negative battery through make contacts 532, at break contacts 532 opens its pull-up circuit, and at its lower make contacts extends the units marking and busy conductors from the switch 500 to the springs of the trunk group relays 220 and 640, by way of cable 586. Relay 530 also at make contacts 533 operates lockout relay 550 which at break contacts 552 removes negative battery from the other trunk access relays to prevent their operation for the moment, and at break contacts 551 opens the circuit of kickoff relay 560 which however, being slow to release, remains operated momentarily. Finally relay 530 at make contacts 531 causes the operation of trunk group relay 220 over the following circuit: ground at contacts 531, conductor 505, make contacts on the operated "0" tens relay not shown, in the switch 500, conductor 504, cable 586 across Figures 6 and 2, winding of relay 220, break contacts 223, 232, 224, 214 and 241 to battery through resistor 245.

Trunk group relay 220 upon operating, at preliminary make contacts 222 locks to battery at resistor 245 independently of contacts 232, by way of break contacts 214 and 241, at break contacts 223 opens its original operate circuit, and at break contacts 224 opens a common point in the operate circuit of the trunk group relays, to prevent any further operations thereof at this time. Relay 220 also, at its lower make contacts prepares the kickoff circuit and extends the units marking and busy conductors from the switch 500 to the first choice trunk select relays of Figure 7. Finally relay 220 at make contacts 221 causes the operation of lockout relays 230 and 240 and the peg count meter as before.

Immediately upon the extension of the units marking conductors to Figure 7, assuming both first choice trunks 3 and 4 of the associated trunk sub-group to be idle, and that relays 710, 720 and 730 in Figure 7 are operated as shown, ground from make contacts 721 on the first pre-select relay is passed back to the switch 500, by way of the 3—8 units conductor 265, cable 286 to Figure 2, make contacts 229, conductor 575, cable 586 to Figure 5, make contacts 538 and conductor 518 to the 3—8 units relay, not shown, in the switch 500. The 3—8 units relay in the switch 500 thereupon operates and causes the extension of the call to trunk #3 and the release of trunk access relay 530. Relay 530 thereupon immediately releases lockout relay 550 and trunk group relay 220. Relay 550 re-closes the circuit of the slow to release kickoff relay 560 to prevent the release of this relay, and at break contacts 552 again connects negative battery to the operate circuit of the associated access relays. Lockout relays 230 and 240 then also release in succession, and re-connect battery to the operate circuit of the associated trunk group relays. The #3 trunk repeater now opens the circuit of the normally operated trunk busy relay 710, and this relay promptly restores. Pre-select relay 740 thereupon operates and unlocks pre-select relay 720, which restores, the action being similar to that described for Figure 3.

A second call to the "0" trunk group therefore, from the second switch group, will cause the operation of the 4—9 units relay in the calling switch, from ground at make contacts 741, by way of conductor 266, cable 286 to Figure 2, make contacts 221A, conductor 576, cable 586, and contacts of the operated access relay to the calling switch. The 4—9 units relay of the calling switch thereupon causes the seizure of the #4 trunk and the release of the trunk access and trunk group relays, and the seizure of the #4 trunk in turn causes the release of the normally operated trunk busy relay 730.

Upon the release of trunk busy relay 730, reset relay 750 will operate, from make contacts 742 and break contacts 731. Reset relay 750 thereupon opens break contacts 751 and unlocks pre-select relay 740, which restores. If the #3 trunk is again idle at this time, trunk busy relay 710 will again be in the operated position and the opening of make contacts 742 will cause the release of reset relay 750, while the closing of break contacts 742 causes the re-operation of pre-select relay 720, by way of make contacts 711. Relay 720 thereupon locks as before to ground at back contacts 743 by way of its own make contacts 722. The next "0" trunk call from the same switch group, will therefore again be directed to trunk #3.

If the #3 trunk is still busy however, when the seizure of the #4 trunk causes the release of trunk busy relay 730, reset relay 750 will operate as before from make contacts 742 and break contacts 731, and will again release pre-select relay 740. This time however the release of relay 740 does not release reset relay 750 but sets up an alternate circuit for this relay, from ground at back contacts 742 through break contacts 711 and 731. Meanwhile, a circuit has been completed to busy switching relay 760 through break contacts 712 and 732 and this relay operates and extends the units marking and other control conductors through to the overflow trunk select relays of Figure 4.

A third call to the "0" trunk group from the same switch group will therefore cause the units marking and busy conductors to be extended from the calling switch to Figure 4, where the operated pre-select relay will cause the operation of the corresponding units relay in the calling switch, with or without the operation at the same time of the units switching relay, as required, by way of the cable 786, make contacts of relay 760, cable 286, make contacts of relay 220, cable 586, and make contacts of the operated trunk access relay. If all trunks in the overflow group are also busy however, all-trunks-busy relay 490 will be normal and will pass busy ground instead of units marking ground back to the calling switch by way of conductor 408, cable 786, make contacts 768, conductor 268, cable 286, make contacts 223A, conductor 578, cable 586, and make contacts corresponding to contacts 532A or 542A on the operated trunk access relay.

It is thus seen that all calls to the "0" group of trunks from the first switch group will be directed by Figure 3 to the preferred trunks 1 or 2 if available, and if both of these trunks are busy, such calls will be directed by Figure 4 to the second choice trunks 5, 6, 7, 8, 9 or 10 if available. Similarly all calls to the "0" group of trunks from the second switch group will be directed by Figure 7 to the preferred trunks 3 or 4, and if these are busy, such calls will be directed by Figure 4 to a second choice trunk. In this way, the trunks may be employed very efficiently, especially if the traffic peaks do not occur at the same time in the different switch groups, thus permitting a reduction in the total number of trunks required. If less than ten trunks are employed in the group, the remaining terminals of the associated tens relay in the switches may be used for subscribers lines, reached by dialing a suitable multi-digit subscriber number. The trunk selecting equipment of the invention would of course, not be operated on calls to such lines.

*Calls to trunk group "9"*

To make a call to trunk group "9," which is assumed to be a regular trunk group without overflow facilities, the calling subscriber will dial the single digit "9" instead of "0." If for example, the switch 100 is the calling switch involved, the dialing of the digit "9" thereto by the calling party, causes the operation of the "9" tens relay therein, as well as that of the trunk access relay 130. Trunk access relay 130 thereupon locks operated, extends the units marking and busy conductors to the springs of trunk group relays 210 and 630 as before, and again operates lockout relay 150. Relay 130 also at this time causes the operation of trunk group relay 630, from ground at make contacts 131, conductor 105, make contacts of the operated tens relay "9," not shown, in the switch 100, conductor 103, cable 206, winding of relay 630, back contacts of the make-before-break springs 631, and break contacts 651 to battery at resistor 655.

Trunk group relay 630 upon operating over this circuit, locks to battery at its own make contacts 631, disconnects the battery from resistor 655, and operates lockout relay 650, which completely disconnects resistor 655 and at make contacts 652 closes a peg count meter circuit to the trunk select relays represented by the rectangle 660. Relay 630 also, at its lower make contacts, extends the units marking and busy conductors from the calling switch 100 to the same trunk select relays. These trunk select relays are similar to those of Figure 4, but would normally be associated with the trunks in regular order, starting with the first, as a matter of convenience.

Upon the extension of the units marking conductors to the trunk select relays 660, the operated pre-select relay therein, not shown, passes back ground, by way of cable 206, to the switch 100, where it causes a units relay alone or a units relay and the units switching relay to operate, and extend the call to the pre-selected trunk in the trunk group "9." If all of these trunks are busy of course, no units marking conductor will be grounded, but instead the trunk select relays will ground the busy conductor 670 to operate the busy relay of the calling switch by way of make contacts 639, conductor 178 and cable 206. The operation of either the units relays or the busy relay causes the release of the trunk access and trunk group relays, in the manner previously described.

If the call is from a switch in the second switch group, such as the switch 500 for example, the action will be similar, except for the operation of different trunk access and trunk group relays. In this case the dialing of the digit "9" to the switch 500 causes the operation of trunk access relay 530, in addition to operating the tens relay "9," not shown, in the said switch.

Trunk access relay 530 thereupon locks operated and cuts off the other trunk access relays in the previously described manner, and extends the units marking and busy conductors from the switch 500 to the springs of trunk group relays 220 and 640. Relay 530 also at make contacts 531 causes the operation of trunk group relay 640 over the following circuit: ground at make contacts 531, conductor 505, make contacts of the operated tens relay "9," not shown, in the switch 500, conductor 503, cable 586, winding of relay 640, back contacts of the make-before-break springs 641, and break contacts 651 to negative battery. Relay 640 thereupon locks operated, causes the disabling of the other trunk group relays, and extends the marking and control conductors from switch 500 to the trunk select relays 660. The trunk select relays 660 thereupon cause the switch 500 to seize the pre-selected trunk or to give busy tone as required, and to release the trunk access and trunk group relays, the action being similar to that already described.

*Blocked call*

If, upon the grounding of the calling switch's units marking conductors by the trunk selecting relays on a trunk call, the units relays involved fail to operate, or the switch for some reason fails to switch through properly to the selected trunk, the operated trunk access relay will not restore. If these relays remain operated beyond the release time of the associated slow-to-release kickoff relay, the later will release.

In the case of a call from the first switch group for example, in which the trunk access relays of Figure 1 and the trunk group relays of Figure 2 have extended the units marking and the kickoff and busy leads to Figure 3, with the #1 trunk idle, and the call is not switched through promptly, kickoff relay 160 will restore. Kickoff relay 160 thereupon, at make contacts 161 further opens the operate circuit of the trunk access relays, and at break contacts 162 grounds the kickoff conductor 171. This ground thereupon passes through make contacts 215 and causes the operation of pre-select relay 340, by way of conductor 251, and make contacts 323 and 331, to select the next trunk. Kickoff relay 160 at the same time, at break contacts 163 grounds the busy conductor 178, thereby to cause the calling switch to give the busy signal, and release the trunk access and trunk group relays. The calling party upon hearing the busy signal hangs up and tries again, whereupon the call is directed to the next trunk. If trunks 1 and 2 are busy and the control conductors are extended to Figure 4 at the time the blocked call occurs, ground on the kickoff conductor will pass through make contacts 361 to Figure 4 by way of conductor 401 and will advance the pre-select relays therein in similar manner. This ground will now be ineffective as to Figure 3 since both relays 320 and 340 will be normal, and the kickoff lead will be open at make contacts 323 and 344.

If the pre-selected trunk, at the time a blocked call occurs, is the last trunk of the subgroup, such as where the pre-select relay 340 is operated, grounding of the kickoff conductor will operate reset relay 350, by way of break contacts 323 and make contacts 344. Reset relay 350 will thereupon release pre-select relay 340, which in turn will release reset relay 350 and operate pre-select relay 320. In like manner, if the pre-selected trunk is the last of the second choice trunks, pre-select relay 480 will be operated in Figure 4, and the other pre-select relays will be normal. Grounding of the kickoff conductor 401 in this case will operate reset relay 495, by way of back contacts 423, 445 and 465 and similar contacts on the other pre-select relays not shown, and make contacts 485. Reset relay 495 will then release relay 480, which will release relay 495 and reoperate pre-select relay 420 or the pre-select relay corresponding to the first idle trunk. Blocked calls from the second switch group will act similarly, with respect to Figure 7 and Figure 4, except that in the latter case the kickoff conductor will reach Figure 4 by way of make contacts 761 and cable 786. In the case of a call to the "9" trunk group, Figure 6 will act similarly, the kickoff conductors in Figure 6 being indicated at 171 and 571.

The description having now been completed, what is considered new and is desired to be protected by Letters Patent is set forth in the following claims.

What is claimed is:

1. In a telephone system, a first and a second relay-type switch, a first group of trunks accessible to said first switch, a second group of trunks accessible to said second switch, a third group of trunks accessible to both of said switches and all of said trunks having the same call number, means associated with said first switch and operated responsive to impulses received by said switch representing said call number to cause it to seize an idle trunk in said first group of trunks, and if none are available therein, to cause said first switch to seize an idle trunk in said third group of trunks, and means associated with said second switch and operated responsive to impulses received by said switch representing said call number to cause it to seize an idle trunk in said second group of trunks, and if none are available therein, to cause said second switch to seize an idle trunk in said third group of trunks.

2. In a telephone system, first and second groups of all-relay switches, group relays in said switches, a first accessible respectively to said first and second groups of switches, a second group of first-choice trunks and a group of second-choice trunks accessible to both of said groups of switches all of said trunks having the same call number, said second choice group and one of said first choice groups connected to one of the said group relays in each of said switches, and means associated with said switches and operated responsive to impulses representing said call number received by any one of said switches for causing such group relay therein to extend a connection to a trunk in said first group of first-choice trunks if the said one switch is in the first of said switch groups, to a trunk in said second group of first-choice trunks if said one switch is in the second of said switch groups, and to a trunk in said group of second-choice trunks regardless of the switch group involved if no idle trunks are available in the associated first-choice trunk group.

3. In a telephone system, a plurality of groups of all-relay switches, group relays in said switches, a separate group of first-choice trunks accessible respectively to each of said switch groups and a common group of second-choice trunks accessible to all of said switch groups, the associated first choice trunk group and said common trunk group connected to one of the said group relays in each of said switches, and each of said trunk groups having the same call number, and means associated with said switches and operated responsive to impulses representing said call number received by any of the said switches in any of said switch groups for causing the said one group relay therein to extend a connection to an idle trunk in the first-choice trunk group associated with such switch group, and if no idle trunk is available in such trunk group to extend the connection to a trunk in said second-choice trunk group.

4. In a telephone system, a plurality of groups of switches for extending calls, group relays in said switches, contacts on said relays, a plurality of first-choice trunk groups and a second-choice trunk group, said second choice group and one of said first choice groups connected to the contacts of one of the said group relays in each of said switches, each of said trunk groups having the same call number and each of said first choice trunk groups being accessible to a different switch group through the said group relay contacts thereof, trunk selecting equipment external to said switches, means in each said switch responsive to impulses received thereby representing said call number for causing such switch to momentarily seize said trunk selecting equipment, and means in said trunk selecting equipment responsive to such seizure for causing such switch to extend the call through the contacts of the said one group relay therein to a pre-selected idle trunk in the first choice trunk group accessible to the switch group involved, and if no such trunk is available in such first choice trunk group to extend such call through the contacts of the said one group relay to a pre-selected idle trunk in said second choice trunk group.

5. In a telephone system, a first and a second relay-type switch for extending connections to trunks, group and units relays in said switches, contacts on said relays, first and second groups of first choice trunks and a group of second choice trunks, said second choice group and one of said first choice groups connected to the contacts of one of the said group relays in each of said switches, each of said trunk groups having the same single digit call number and each said group of first choice trunks accessible to a different one of said switches through the said group relay contacts thereof, trunk selecting equipment common to said switches, means in each said switch responsive to impulses received thereby representing said call number for causing said switch to operate the said one group relay therein and to momentarily seize said trunk selecting equipment, means in said trunk selecting equipment responsive to such seizure for controlling the operation of the units relays of such switch to extend the call through the contacts of said units relays and said one group relay to a pre-selected idle trunk in the group of first choice trunks accessible to such switch, and, if no idle trunk is available in such first choice trunk group, to extend such call through the contacts of said units relays and said one group relay to a pre-selected idle trunk in said group of second choice trunks, and means responsive to such extension to disengage said trunk selecting equipment.

6. In a telephone system, a first and a second group of relay-type switches, group and units relays in said switches, contacts on said relays, a group of trunks accessible to said switches and comprising a first and a second sub-group of first-choice trunks associated respectively with said first and second group of switches and a sub-group of second choice trunks associated with both said groups of switches, all of said sub-groups having the same call number, a first, a second and a third group of trunk selecting relays corresponding respectively with said first and second groups of first-choice trunks and said group of second-choice trunks for pre-selecting idle trunks in the corresponding sub-group, units control conductors in each switch, means responsive to impulser representing said call number received by any switch in said first group of switches to cause the control conductors thereof to be extended momentarily to said first group of trunk selecting relays, means responsive to impulses representing said call number received by any switch in said second group of switches to cause the control conductors thereof to be extended momentarily to said second group of trunk selecting relays, means responsive to impulses representing said call number received by any switch in either group of switches at a time when no idle trunk is available in the corresponding sub-group of first-choice trunks to cause the control conductors of such switch to be extended momentarily to said third group of trunk selecting relays, and means responsive to the extension of said control conductors from any of said switches to any of said groups of trunk selecting relays for controlling such switch over said conductors to cause it to complete a connection through the contacts of its group and units relays to a pre-selected idle trunk in the sub-group of trunks corresponding to said trunk selecting relays.

7. In a telephone system, a first and a second group of relay-type switches, a trunk group comprising a first, a second and a third sub-group of trunks all having the same call number, a first and a second group of trunk access relays corresponding to said switch groups, a group of trunk group relays, a first, a second and a third group of trunk select relays corresponding to said trunk sub-groups for pre-selecting an idle trunk in the corresponding sub-group, unit conductors for each switch, means responsive to impulses representing said call number received by one of said first group switches for operating a relay in said first group of trunk access relays and a relay in said group of trunk group relays to extend said unit conductors from such calling switch to said first group of trunk select relays, means in said first group of trunk select relays operative when all trunks in the first sub-group are busy to extend said conductors to said third group of trunk select relays, means responsive to impulses representing said call number received by one of said second group switches for operating a relay in said second group of trunk access relays and a relay in said group of trunk group relays to extend said unit conductors from such calling switch to said second group of trunk select relays, means in said second group of trunk select relays operative when all trunks in the second sub-group are busy to extend said conductors also to said third group of trunk select relays, means in any such calling switch controlled over such extended unit conductors for completing the connection to a pre-selected idle trunk in the sub-group corresponding to the trunk select relay group to which said conductors have been extended, and means to cause only one trunk access and trunk group relay to be operated at a time in each of said groups of trunk access and trunk group relays.

8. In a telephone system, a first and a second group of relay-type switches, a first, a second and a third group of trunks accessible to said switches and all having the same call number, a first group of trunk access relays comprising a relay for each switch in said first switch group, a second group of trunk access relays comprising a relay for each switch in said second switch group, a group of trunk group relays comprising a relay for each of said switch groups, a first, a second and a third group of trunk select relays corresponding to said trunk groups for pre-selecting idle trunks in the corresponding trunk group one at a time in succession, unit conductors and a busy conductor for each switch, means responsive to impulses representing said call number received by a switch in said first switch group for operating the trunk access relay corresponding to such switch in said first trunk access group and for operating the trunk group relay corresponding to said first switch group to extend said conductors from such calling switch to said first group of trunk select relays, means in said first group of trunk select relays operative only when all of said first group trunks are busy to extend said conductors to said third group of trunk select relays, means responsive to impulses representing said call number received by a switch in said second switch group for operating the trunk access relay corresponding to such switch in said second access group and for operating the trunk group relay corresponding to said second switch group to extend said conductors from such calling switch to said second group of trunk select relays, means in said second group of trunk select relays operative only when all of said second group trunks are busy to extend said conductors to said third group of trunk select relays, means in such calling switch controlled over said unit conductors for completing a connection to the pre-selected idle trunk in the trunk group corresponding to the trunk select relay group to which said conductors have finally been extended, and other means in such calling switch controlled over said busy conductor from said third trunk select relay group when said conductors are extended thereto and all of said third group trunks are busy, to prevent completion of the call and to give the busy signal.

9. In a telephone system, a first and a second relay-type switch, group and units relays and a sub-group relay in each said switch, contacts on said relays, a main trunk group comprising a first and a second first-choice trunk group and a second-choice trunk group all having the same call number, means for extending calls through said switches and the contacts of the said sub-group and units and group relays therein to a trunk in said main trunk group in response to impulses representing said call number received by said switches, trunk selecting equipment common to said switches for directing such calls from said first switch to a pre-selected idle trunk in said first first-choice trunk group, for directing such calls from said second switch to a pre-selected idle trunk in said second first-choice trunk group, and for directing such calls from either switch to a pre-selected idle trunk in said second-choice trunk group in cases where no idle trunk is available in the corresponding first-choice trunk group, means for seizing said equipment from a calling switch responsive to the receipt by said switch of said impulses representing said call number, means for releasing said equipment immediately in response to the completion of the connection, and means for also releasing said equipment in cases where an idle trunk is available in the trunk group to which said call is directed and the connection is not completed within a given time interval.

10. In a telephone system, a first and a second relay-type switch, a group relay in each said switch, contacts on said relays, a first and a second and a third trunk group accessible through the contacts of said group relays and all having the same call number, means in each said switch for extending calls through the contacts of the said group relay therein to a trunk in one of said trunk groups in response to the receipt of impulses representing said call number by such switch, trunk selecting equipment normally disconnected from said switches for directing any such calls originating in said first switch to a pre-selected idle trunk in said first trunk group, for directing any such calls originating in said second switch to a pre-selected idle trunk in said second trunk group, and for directing any such calls regardless of origin to a pre-selected idle trunk in said third group of trunks in cases where all trunks are busy in the trunk group to which such call would be normally directed, means for seizing said trunk selecting equipment from such calling switch in response to the receipt of said impulses thereat, means for releasing said equipment in response to the completion of the connection, means for also releasing said equipment in cases where an idle trunk is available in the group to which such call has been directed and the connection is not completed promptly, and means for causing said trunk selecting equipment to pre-select the next available idle trunk in the appropriate trunk group in such cases where such connection is not completed promptly.

11. In a telephone system, a first and a second group of relay type switches, a first, a second and a third group of trunks accessible to said switches and all having the same single-digit call number, a first, a second and a third group of trunk select relays corresponding to said trunk groups for pre-selecting the trunks of the corresponding trunk group one at a time in rotation, trunk access and trunk group relays associated with said trunk select relays, means in each said switch responsive to the receipt of impulses representing said call number thereby for preparing connections to said trunks and for operating different ones of said trunk access and trunk group relays dependent on the calling switch, a plurality of control conductors, a busy conductor and a kickoff conductor extended by certain of said operated trunk access and trunk group relays to said first trunk select relay group in cases where such call is from a switch in the first said switch group, and to said second trunk select relay group in cases where such call is from a switch in the second said switch group, means in said first and second groups of trunk select relays for making such extended control and kickoff conductors ineffective thereat and for extending said control, busy and kickoff conductors to said third group of trunk select relays in cases where all trunks are busy in the associated first or second trunk group, means in such calling switch controlled over such extended control conductors for causing such switch to complete a connection to a trunk pre-selected by the trunk select relay group to which said conductors have been extended and to release said operated trunk access and trunk group relays, means for energizing said busy conductor in cases where said conductor has been extended to said third group of trunk select relays at a time when all trunks in said third trunk group are busy, means in such calling switch responsive to such energization for causing said switch to give a busy signal and release said operated trunk access and trunk group relays, means for energizing said kickoff and busy conductors in cases where, with an idle trunk available in the trunk group corresponding to the trunk select relay group to which said conductors have been extended said connection is not completed within a given time interval, means in such calling switch responsive to such energization of said busy conductor for causing said switch to again give a busy signal and release said operated trunk access and trunk group relays, and means responsive to such energization of said kickoff conductor in such trunk select relay group to which said conductor has been extended for causing the trunk select relays therein to pre-select the next idle trunk in the associated trunk group.

12. In a telephone system as in claim 11, means for causing said control and busy and kickoff conductors to be extended by said trunk access and trunk group relays to only one of said first and second groups of trunk select relays at any given time.

13. In a telephone system as in claim 11, means for causing only one of said switches to be controlled over any of said control and busy conductors at a time.

JOHN H. VOSS.

REFERENCES CITED

The following references are of record in the file of this patent:

UNITED STATES PATENTS

| Number | Name | Date |
|---|---|---|
| 1,518,862 | Lomax | Dec. 9, 1924 |
| 1,809,882 | Wright | June 16, 1931 |
| 2,340,554 | Peterson | Feb. 1, 1944 |